(12) United States Patent
Moran et al.

(10) Patent No.: US 6,751,969 B1
(45) Date of Patent: Jun. 22, 2004

(54) DEVICE FOR USE IN MAINTAINING A TEMPERATURE IN A VEHICLE OR SHIPPING CONTAINER

(75) Inventors: Mark Moran, Landenberg, PA (US); John Pia, Landenberg, PA (US)

(73) Assignee: Kaolin Mushroom Farms, Inc., Kennett Square, PA (US)

( * ) Notice: Subject to any disclaimer, the term of this patent is extended or adjusted under 35 U.S.C. 154(b) by 0 days.

(21) Appl. No.: 10/309,540

(22) Filed: Dec. 4, 2002

(51) Int. Cl.[7] .............................................. F25D 17/00
(52) U.S. Cl. ........................................ 62/177; 62/329
(58) Field of Search .................... 62/177, 329, 465; 160/1; 236/51

(56) References Cited

U.S. PATENT DOCUMENTS

| | | | | |
|---|---|---|---|---|
| 3,638,450 A | * | 2/1972 | Falk | 62/329 |
| 3,882,575 A | * | 5/1975 | Jolly | 24/203 |
| 4,476,910 A | * | 10/1984 | Saito | 160/291 |
| 4,669,775 A | * | 6/1987 | Mathers | 296/141 |
| 4,693,291 A | * | 9/1987 | Andrews | 160/388 |
| 5,028,087 A | * | 7/1991 | Ells | 296/24.1 |
| 5,373,780 A | * | 12/1994 | Bianco | 99/475 |
| 6,105,653 A | * | 8/2000 | Armstrong | 160/122 |

* cited by examiner

Primary Examiner—Marc Norman
(74) Attorney, Agent, or Firm—Paul & Paul (57) ABSTRACT

The present invention relates to a device for use in maintaining a temperature in a vehicle or a shipping container. The device includes a roller having a sheet attached to the roller. One end of the sheet is connected to the roller and the sheet can be rolled around the roller and unrolled from the roller. The sheet has a size such that the sheet can extend substantially transversely across the cargo area of the vehicle or shipping container when the device is mounted on the vehicle or shipping container and the sheet is unrolled from the roller. The device allows for a user to simply unroll the unattached end of the sheet from the roller when the user needs to load or unload goods in the cargo area of the vehicle or shipping container in which the device is mounted.

22 Claims, 5 Drawing Sheets

DEVICE FOR USE IN MAINTAINING A TEMPERATURE IN A VEHICLE OR SHIPPING CONTAINER

BACKGROUND OF THE INVENTION

1. Field of the Invention

The present invention generally relates to a device for use in maintaining the temperature in the air in a region in a cargo area a sheet of the device is unrolled in a position substantially transversely across the cargo area. The device is mountable in a cargo area in a vehicle or a shipping container and can regulate the velocity of air flowing through a cargo area of the vehicle or shipping container and/or can deflect air onto cargo in the cargo area. A user can install the device in a vehicle or shipping container or the device can be included with the original equipment as sold by the manufacturer of the vehicle or shipping container. If the device is provided as an aftermarket item, the device can be installed by a user in one vehicle or shipping container and then removed from that vehicle or shipping container and then be installed in another vehicle or shipping container.

2. Brief Description of Prior Art

It is generally well understood that it is desirable to prevent deterioration in the quality and appearance of consumable perishable goods, such as fresh fruits, vegetables, cheeses, meats, fish and the like, during lengthy transportation and holding operations, up to their final arrival in the market. Other goods such as chemicals, pharmaceuticals and electronic items such as integrated circuit chips and nanotechnology also may require an environment in which the temperature is regulated. Some foodstuffs that must be shipped long distances to market are shipped packed in crushed ice in the shipping container or are kept in a refrigerated environment by an environmental control system. Typically, refrigerated vehicles or freezer trucks transport the foodstuffs to the market.

When the goods arrive by a transporting vehicle or shipping container at a final destination, the goods must be unloaded from the cargo area of the vehicle or shipping container. During this unloading process and during transit, the goods to be consumed should be kept in the desired temperature controlled environment for as long as possible.

Previously, attempts were made to erect a strip curtain inside the cargo area made up of a plurality of strips hanging down from a ceiling of the vehicle or shipping container in an attempt to maintain the temperature of the air in the cargo area where the goods are stored.

Figure 1:
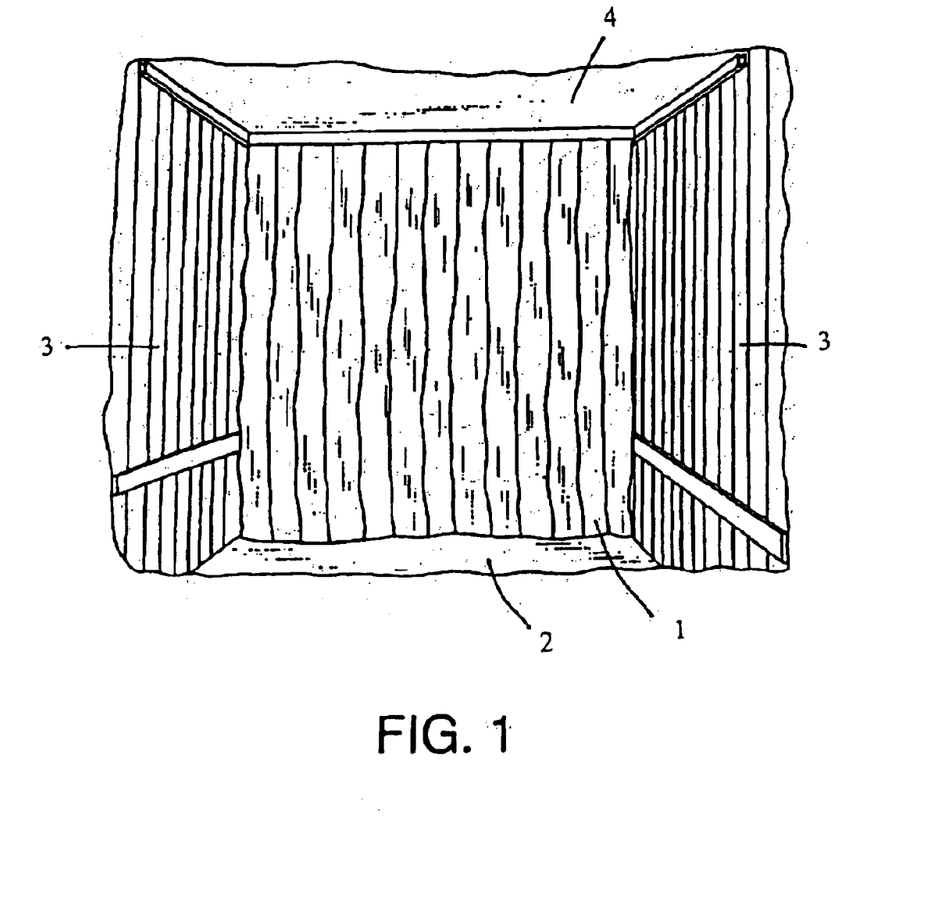
FIG. 1 is a perspective view of a prior art strip curtain of a plurality of hanging strips shown in a container.

FIG. 1 is a perspective view through an opening of a container showing the interior of the container. Prior art hanging strips 1 are connected to the interior of the container. The hanging strips 1 are mounted on either the ceiling 4 or the sidewall 3 of the container. The cargo area of the container extends throughout the interior of the container and is partially enclosed by a floor 2, sidewalls 3, endwall (not shown), and ceiling 4. The cargo area extends to the opening of the container. A closure (not shown) is located at an opening of the container. The closure is located in a position such that when it is desired to transport cargo located in the cargo area the closure may be moved into position and cover the opening of the container so as to secure the cargo therein.

When the strips are located in a position extending transversely across the cargo area, the goods could be unloaded from the cargo area by carrying out the perishable items while the hanging strips hang freely. Since the strips are free to move from side to side, individual strips can swing out of the way when personnel and/or goods are carried through the plane defined by the hanging strips.

One drawback with the erection of a plurality of hanging strips is that the strips can cause injury to personnel who load and unload the goods in the cargo area. The ends of the strips sometimes lay upon the goods as the goods are carried underneath the strips. When the ends of the strips are no longer resting upon the top of the goods being transported under the strips, the strips can fall away from the goods and strike the person unloading the goods, thereby causing injury to that person. In addition, bystanders who are near the goods being transported can suffer injuries from the whipping action of the falling and swinging strips.

Another drawback with the use of a plurality of hanging strips to prevent the escape of air from an environmentally controlled area is that the presence of the strips in the cargo area made loading and unloading of cargo cumbersome since the strips remained in a hanging position between the environmentally controlled zone of the vehicle or container. When a person transports cargo items from the region on one side of the hanging strips to the environmentally controlled region on the other side of the strips, one runs the risk that the strips will interfere with the cargo or become entangled with the cargo. Contact between the hanging strips and the cargo items can also move the cargo items out of their desired configuration as the goods are carried through the hanging strips. Cargo items can even be knocked down onto the flooring of the vehicle or container thereby possibly damaging the cargo.

Another disadvantage with the use of hanging strips to prevent the escape of air from an environmentally controlled region is that when the strips are hanging down between the environmentally controlled region on one side of the hanging strips and the region on the other side of the hanging strips air can pass through the opening between two adjacent strips thereby reducing the effectiveness of the strips at maintaining the temperature of the environmentally controlled region.

Hanging strips have another disadvantage in that the strips are a high maintenance item and require frequent repair or replacement when used as described above. The strips themselves can become damaged and in the case of transparent strips the strips can become hazy and/or lose their transparency due to scratches, scuffing or a buildup of debris, dust or dirt on the strips.

The present invention has been developed in view of the foregoing and to overcome the deficiencies of the prior art.

SUMMARY OF THE INVENTION

The present invention discloses a device for use in maintaining a temperature in a vehicle or a shipping container. The device includes a roller having a sheet attached to the roller. One end of the sheet is connected to the roller and the sheet can be rolled around the roller and unrolled from the roller. The sheet has a size such that the sheet can extend substantially transversely across the cargo area of the vehicle or shipping container when the device is mounted on the vehicle or shipping container and the sheet is unrolled from the roller. The device allows for a user to simply unroll the unattached end of the sheet from the roller when the user needs to load or unload goods in the cargo area of the vehicle or shipping container in which the device is mounted.

It is an object of the present invention to provide a device for use in maintaining a temperature in a vehicle or shipping container which is mountable in the cargo area of the vehicle or shipping container and in which a user can unroll the sheet and thereby place the sheet in an unrolled state such that the sheet extends across the cargo area.

It is an another object of the present invention to provide a device for use in maintaining a temperature in a vehicle or shipping container in which a user can mount the device in the vehicle or shipping container by means of a first and second connecting device.

It is yet another object of the present invention to provide a device for use in maintaining a temperature in a vehicle or shipping, container which has a rolling and unrolling device for repeatedly rolling the sheet onto the roller and unrolling the sheet on the roller.

It is still another object of the present invention to provide a device for use in maintaining a temperature in a vehicle or shipping container which has a remote control device for activating a rolling and unrolling device which rolls and unrolls the sheet on the roller.

Another object is to provide a device for use in maintaining a temperature in a vehicle or shipping container which has a ratcheting device on the roller which holds the sheet in an unrolled position against a tensioning force applied by a biasing device on the roller.

These and other objects of the present invention will become more readily apparent when taken into consideration with the following description and attached drawings.

DETAILED DESCRIPTION OF THE PREFERRED EMBODIMENTS

Figure 2:
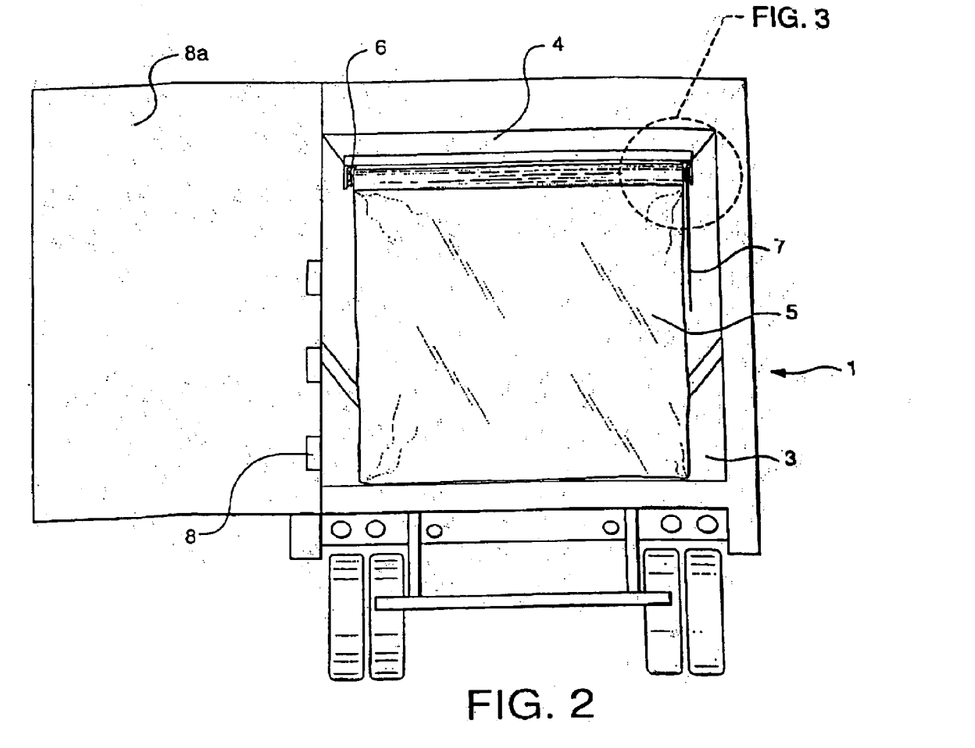
FIG. 2 is a view of a preferred embodiment of the device for use in maintaining a temperature shown mounted in a vehicle.
Figure 3:
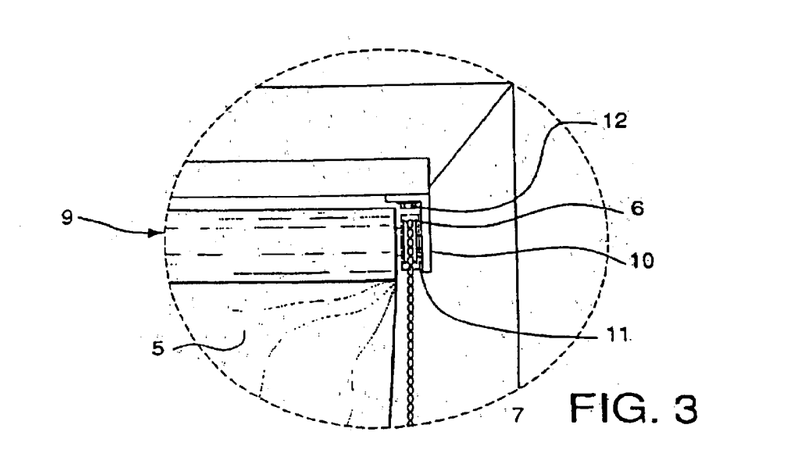
FIG. 3 is an enlarged view of a portion of FIG. 2.

Referring now to the drawings in detail, wherein like reference numerals indicate like elements through the several views, FIGS. 2 and 3 depict an embodiment of a device 9 for use in maintaining a temperature according to the present invention shown mounted in a vehicle 1. The vehicle 1 has a cargo area which extends throughout the interior of the vehicle 1 from the exterior opening of the vehicle 1 to a back wall (not shown) of the vehicle 1. The back wall is located on the opposite side of the device 9 as the opening of the vehicle 1. The vehicle 1 has a closure component or door 8a which is shown mounted by hinges 8 on the vehicle 1. Closure component 8a and a similar opposed second closure component (not shown) can both be placed in the closed position and thereby cover the exterior opening of the vehicle. In FIG. 2, the closure component 8a is shown in the open position. The device 9 is shown attached to a ceiling 4 of the vehicle 1. A sheet 5 is rolled onto a roller 6. A support bracket 10 is affixed to the interior of the vehicle 1 by screw 12 and connects the roller 6 to the vehicle 1. The sheet 5 has a size in an unrolled state sufficient to extend substantially transversely across the cargo area and also extends from the roller 6 located at the ceiling 4 to a floor 2 of the vehicle 1. When the sheet 5 is unrolled such that it extends from the ceiling 4 to the floor 2, a cargo area is defined by a periphery formed from interior surfaces of the vehicle which form a first portion and second portion which is defined by the plane in which the sheet is unrolled. The region in which it is desired to maintain a temperature extends from sheet 5 throughout the region of the cargo area inside of the periphery formed by the plane of the sheet and the interior surfaces of the vehicle facing the cargo. Thus, the cargo area is divided by the sheet 5 into a first and second region of the cargo area.

When sheet 5 extends transversely across the cargo area, the sheet 5 maintains a temperature in the air or gas atmosphere between the first region of the cargo area and the second region of the cargo area.

The device for use in maintaining a temperature shown in FIG. 3 is shown with a support bracket 10 which is connected to the roller 6 which has a pull chain 7 which is at least partially wrapped around the pull chain sprocket 11. In this embodiment, pull chain 7 and pull chain sprocket 11 form a device for rolling and unrolling the sheet on the roller.

Figure 4:
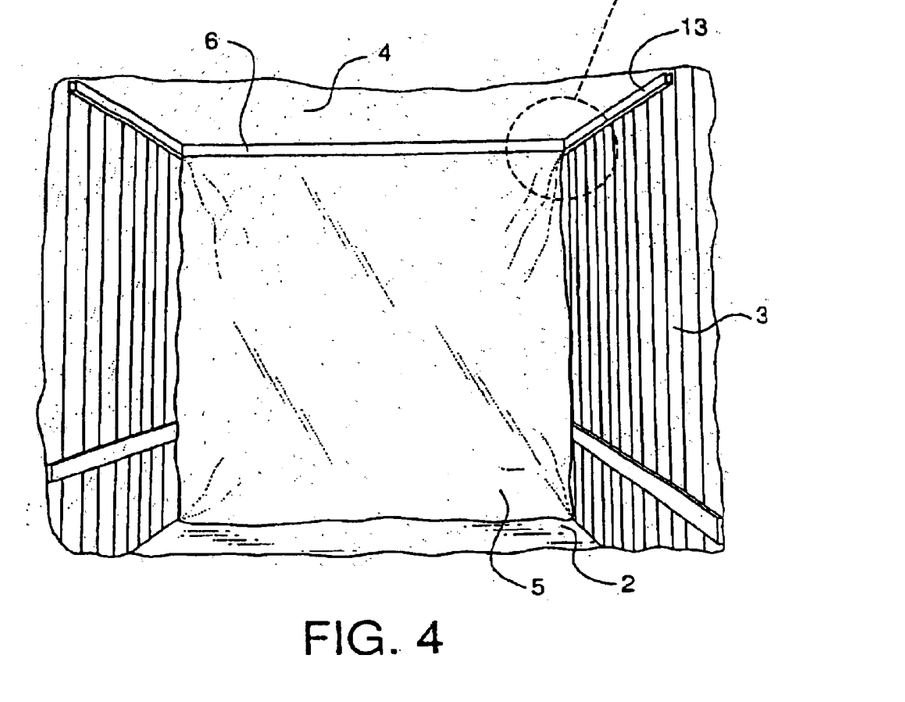
FIG. 4 is a view of a second embodiment of the present invention shown in a container.
Figure 5:
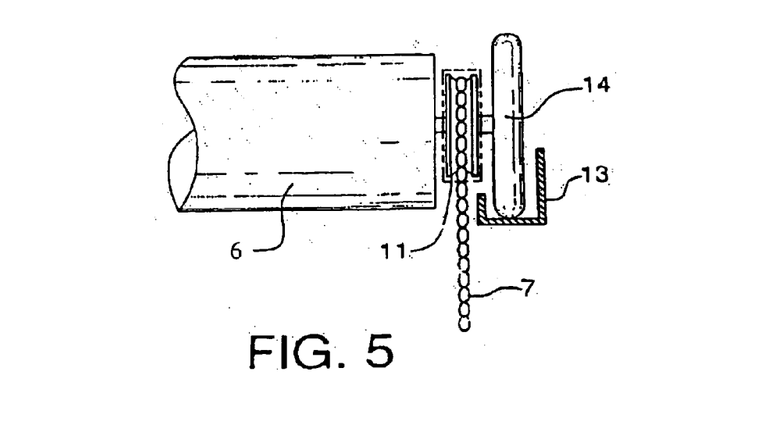
FIG. 5 is an enlarged detail view of a portion of FIG. 4.

In FIGS. 4 and 5, a second embodiment is shown. FIG. 5 is an enlarged view of the designated portion of FIG. 4. The roller 6 is connected to a wheel 14 which rolls in one of two opposed lengths of track members 13 which are provided along the cargo area of the vehicle and extend toward the opening of the vehicle or shipping container. A single length of track members on one side of the vehicle or container can be formed from a series of track members in which the end of one track member is connected to an end of the next track member in a series of track members. In the embodiment shown in FIG. 5, the roller 6 is connected to wheel 14 at one end. Since the roller has wheels 14, the roller 6 can be rolled along both opposed track members 13. When the roller 6 is positioned by a user at the desired location along the track members 13, the user can then affix the roller 6 in position through the use of hooks or other mechanical means. The roller 6 and sheet 5 can then be located at any position along the track members 13 and can be unrolled to maintain a temperature in a region of the cargo area behind the sheet and the second region of the cargo area between the sheet and the opening of the vehicle or shipping container.

Figure 6:
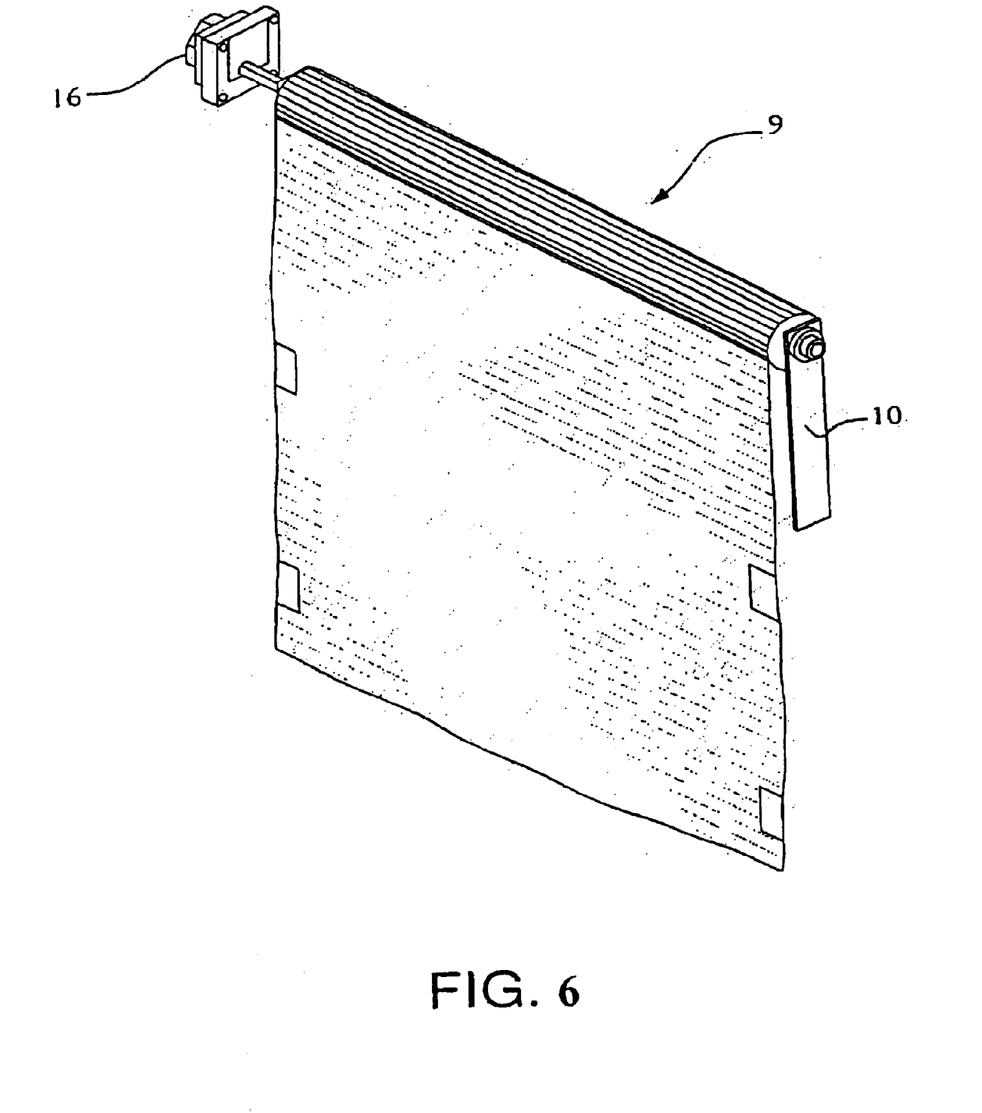
FIG. 6 is a perspective view of a third embodiment of the present invention.

In FIG. 6, a support bracket 10 is shown connected to one end of the roller 6 and a second bracket can be connected to the other end of the roller 6. Both brackets are connected to the interior of the vehicle or shipping container thereby providing support for the device for use in maintaining a temperature 9.

Also shown in FIG. 6 is a motor 16 which rotates the roller 6 and rolls and unrolls the sheet 5 into the position desired by the user. The motor 16 can be electrically operated.

The motor 16 can be equipped with an electromagnetic sensor device which receives electromagnetic signals transmitted from a remote transmitting device when the remote transmitting device is located at a distance away from the sensor device. The sensor device is connected to the device for use in maintaining a temperature. The sensor device is capable of activating the electric motor 16 which rolls and unrolls the sheet 5 on the roller 6. Preferably, the sensor device connected to the device for use in maintaining a temperature can be activated by the remote transmitting device when the user is located outside of the vehicle or shipping container. The ability of a user to operate the remote transmitting device from a distance away from the device for use in maintaining a temperature permits greater efficiencies during operation. A single user can begin rolling and unrolling the sheet on the roller at the optimum time remotely prior to actually loading or unloading cargo to and from the cargo area thereby reducing the amount of manpower needed to transport a load of cargo.

The rolling and unrolling of the sheet of the device can also be activated by a conventional switch or switches. If the device for maintaining a temperature is provided in the vehicle as original equipment from the manufacturer. then the switch or switches can be mounted on the sides of the vehicle or shipping container. The switch or switches can also be connected to the vehicle or shipping container by a freely hanging cable. This allows a user the flexibility to operate the switch or switches from more than one location.

Figures 7, 8:
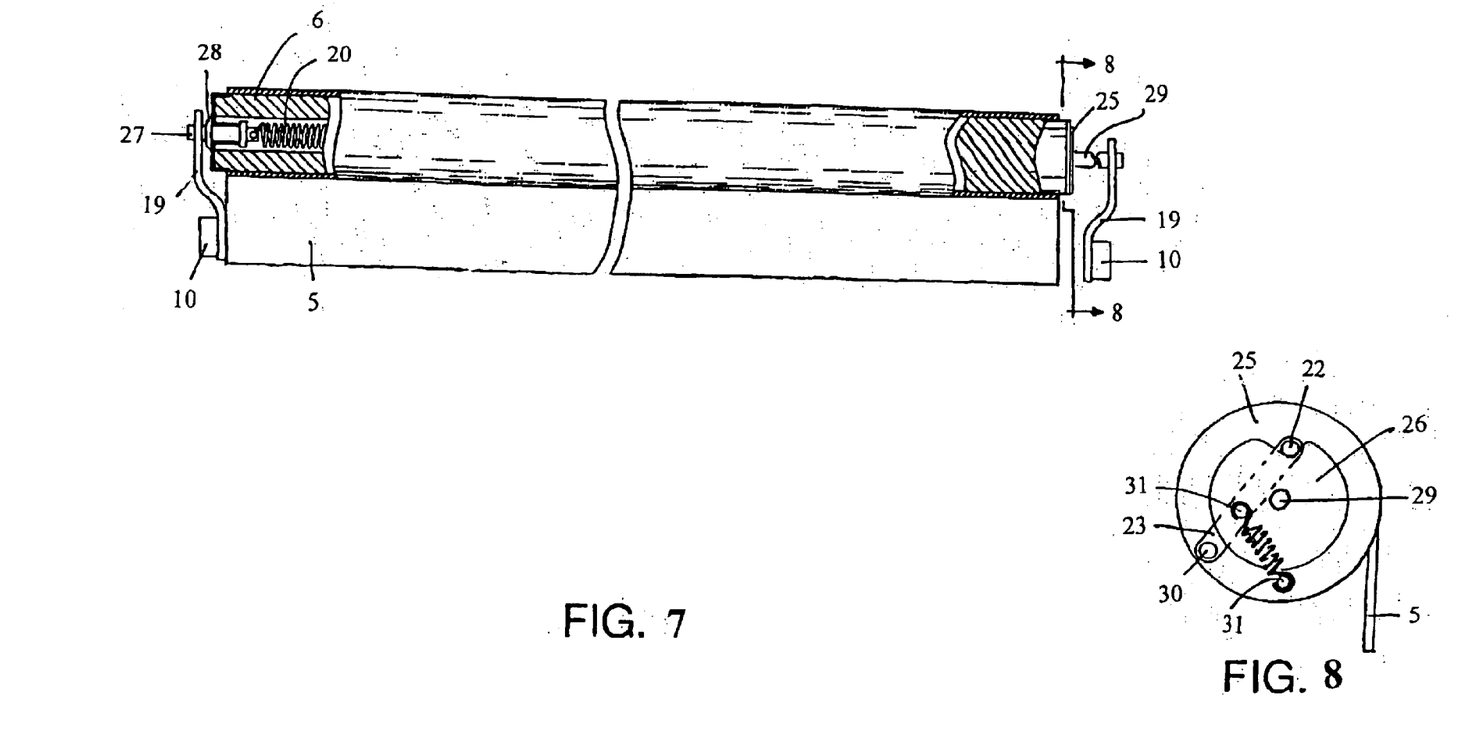
FIG. 7 is an elevational view partly in section of a fourth embodiment of the present invention.
FIG. 8 is a sectional view of the device of FIG. 7 taken along line 8—8 of FIG. 7.

In FIGS. 7 and 8, is shown a fourth embodiment of the present invention. The roller 6 of the device for use in maintaining a temperature of the present invention is provided with a biasing device which is shown in the form of a roller spring 20. A first end of roller spring 20 is connected to square plug 27 which has a square cross section at a location on the square plug 27 which extends through support member 19. The roller 6 can rotate independently of square plug 27 since the roller is connected to a spindle 28 which rotates independently of square plug 27.

Support member 19 is affixed to the interior of the vehicle or shipping container by support bracket 10. The other end of the roller spring 20 is connected to the roller 6 in such a manner that the end turns with the roller. Since the first end of the roller spring 20 does not rotate because the square plug 27 to which the roller spring 20 is attached is fixed in place, the roller spring 20 applies a torque to the roller as the roller 6 unrolls.

The torque applied by roller spring 20 acts to apply a rolling force on the roller 6 which tends to roll up the sheet 5 from an unrolled position. When a user desires to unroll the sheet 5 and place the sheet 5 in an unrolled position, the user can attach the free end of the sheet 5 to a fixed object by the use of, for example, a hook attached to a support strip on the free end of the sheet 5. When the user then seeks to roll up the sheet 5 after unhooking the hook, the torque provided by the roller spring 20 which provides the tensioning force on the sheet 5 acts to roll up the sheet 5 back to the rolled state. In short, the biasing device, in this case the roller spring 20 on the roller 6 assists the user in rolling up the sheet 5.

FIG. 7 also depicts the ratcheting device on the roller 6 which engages the roller 6 and holds the roller 6 in a nonrotating position when an unrolling force no longer acts on the sheet 5. The ratcheting device also permits the release of the roller 6 from a nonrotating position and allows for the rolling of the sheet 5 into the rolled state after the application of a threshold force which unrolls the sheet 5 at a predetermined velocity. The threshold force which releases the ratcheting device can be described as an initial jerking motion. The threshold force allows the ratcheting device to disengage the roller 6, thus permitting the tensioning force applied on the sheet 5 on the roller 6 to roll the sheet 5 into the rolled state.

A sectional view of one form of the ratcheting device in the fourth embodiment of the present invention is shown in FIG. 8 which is located on an end of roller 6. Disc 26 is connected to roller 6 and rotates in unison with the roller 6. End plug 29 is affixed to plate 25 and is inserted through a hole in the center of disc 26 into the roller 6. End plug 29 continues through plate 25 to the nonroller side of plate 25. End plug 29 can have a shape such as a square shape conforming to a cutout portion of plate 25 where end plug 29 penetrates plate 25 such that there is no relative rotating movement between plate 25 and end plug 29.

During assembly of this embodiment of the device for use in maintaining a temperature, once the plate 25 and end plug 29 are inserted into the roller 6, end plug 29 can be set down in between two prongs of a yoke-like structure at the top end of support member 19. Support member 19 thereby prevents the end plug 29 from rotating.

As a user pulls down on the free end of sheet 5 at a threshold force at a predetermined velocity the resulting rotation of the roller 6 and disc 26 allows the lever arm 23 of the ratcheting device to pivot at pivot peg 30 thereby allowing peg 22 on the lever arm to disengage disc 26. Lever arm spring 24 is selected such that the lever arm 23 disengages at a predetermined rotating velocity. Lever arm spring pegs 31 connect the lever arm spring 24 to the plate 25.

The device of the present invention can be used in vehicles such as trucks, in particular, refrigerated trucks or freezer trucks. The device can also be used in a shipping container such as a truck trailer, for example. Typically, truck trailers have a width of 102 inches. If one allows for 2 to 4 inches of insulation on the interior of the truck, then the width of a cargo area for which the temperature is to be maintained is 96 inches. Accordingly, a sheet having a width of 96 inches can be used in order to extend transversely across the cargo area. The width of the sheet to be used can vary accordingly with the size of the cargo area in which the device is mounted. Preferably, the sheet has a width of 90–96 inches in order that the sheet can allow for the minimization of air flow from the cargo area region on one side of the sheet flowing into the cargo area region at the other side of the sheet.

In order to minimize the loss of air from the region in which it is desired to maintain the temperature, the device for use in maintaining a temperature of the present invention can be accommodated in a recess such as a groove or channel in the ceiling. Typically, a truck-type vehicle or shipping container in which one wishes to maintain a temperature will have a layer of insulation located on the ceiling. The device of the present invention can be located in a recess in the ceiling in order to minimize the size of the gap above the roller through which air can escape. If the device for use in maintaining a temperature is provided in original equipment provided by the manufacturer of the vehicle or shipping container, then the ends of the roller having the sheet can be recessed into the sides of the vehicle or shipping container in order to further minimize the loss of air from the region in which the temperature is maintained by the device.

In some instances, depending on the type of cargo being carried or the environmental conditions, a user of the device may wish that some air flow into the region where the temperature is maintained and then have the air flow onto the cargo. Accordingly, a user can adjust how far down the sheet is unrolled and thereby control how much air flows through the cargo area and onto the cargo by the air being deflected off of the sheet.

In addition, the floor of the trailer can be provided with grooves or can be ribbed which allows for the escape of air from the region in which the temperature is maintained even when the sheet is in an entirely unrolled state. Preferably, the ribs or grooves have a depth of about 2 to about 3 inches.

The device can also be used in shipping containers such as ocean going shipping containers which are used for the transportation of goods on ocean-going vessels. The shipping containers can also be refrigerated shipping containers for transporting refrigerated goods.

The sheet can be a fibrous or non-fibrous sheet and can be permeable or impermeable to water vapor. The sheet can comprise a polymeric material, such as vinyl, polyethylene, or polypropylene. The sheet can also be a continuous film, or a woven, nonwoven or spunbonded material. The sheet can be in the form of a sheet having multiple layers of material. In order to minimize the flow of air from a temperature controlled side of the sheet to the other side of the sheet, the sheet can be substantially air-impermeable.

The sheet can also be provided with a portion or a strap which has fabric fastening loops which are engageable with hooks which are located on a portion of the vehicle. A material such as VELCRO is an example of such a material. Alternatively, the hooks can be located on the sheet in the form of a strap and the fabric loops can be on a portion of the interior of the vehicle. When straps are used to fasten the sheet to the interior of the vehicle the sheet can be held in the unrolled state and thereby minimize the loss of air through gaps at the side of the sheet between the vehicle and the sheet.

A support strip can be located at a free end of the sheet on the roller. The support strip provides for the even distribution of a tensile force along the end of the sheet. The support strip can also be sewn into the sheet or affixed to the end of the sheet in a transversely folded portion of the free end of the sheet. Guide members can be provided on the sides of the vehicle or shipping container which guide the support strip in the sheet as the sheet is rolled downwardly.

The support strip can be metal, plastic or wood or any other material which provides sufficient rigidity that a user pulling on the sheet by the support strip attached to the sheet applies a substantially uniform force on the sheet. The guide members prevent the sheet from billowing outwardly or inwardly when a difference in air pressure occurs between the first region and the second region of the cargo area. Preferably, the guide members are located vertically on opposite sides of the interior of the vehicle or shipping container.

Billowing of the sheet can result in an excessive loss of air from the region of the cargo area in which the temperature is being maintained, thereby increasing costs.

The sheet can have insulating properties sufficient to maintain a temperature in the region of the cargo area on one side of the sheet while the remaining portion of the cargo area on the opposite side of the sheet is at a different temperature.

Preferably, a least a portion of the sheet is transparent, thereby allowing a user of the device to be able to see from one side of the sheet to another when the sheet is in an unrolled state. Most preferably, the entire sheet is transparent.

Other forms of rolling and unrolling devices which can be used in place of the pull chain and pull chain sprocket are flexible devices such as string, cord, rope or straps which are wrapped around the roller in a groove. The flexible devices rotate the roller when a user pulls on the flexible device in the direction of rolling or unrolling the sheet.

The pull chain shown in FIGS. 3 and 5 can be a single continuous closed loop or can be a single length of rope, chain, string or cord having two free ends. In addition, even when the device for use in maintaining a temperature is provided with a motor for rolling and unrolling the sheet, the device can also be provided with a pull chain to raise or lower the sheet in the event that the motor is not operational.

The present invention also provides the user with the option of installing more than one device in a vehicle or shipping container. For example, if the user provides a cargo area with two of the devices of the present invention extended transversely across the cargo area at different locations, then when the sheets of each of the devices are extended, the cargo area is divided into three regions. Each region has a periphery defined by the plane of the sheet facing the region when the sheet is in an extended position and the interior surfaces of the vehicle or shipping container which are exposed in that region of the cargo area. The temperature of a region so defined in the cargo area can thus be maintained.

It will be recognized by those skilled in the art that changes may be made by the above-described embodiments of the invention without departing from the broad inventive concepts thereof. For example, each of the features described above do not all need to be included in a single device. Rather, one or more features can be provided in a single device where desired and in any combination. It is understood, therefore, that this invention is not limited to the particular embodiment disclosed, but it is intended to cover all modifications which are within the scope and spirit of the invention.

What is claimed is:

1. A device for use in maintaining a temperature in a region in a cargo area of a vehicle, said region being defined by a periphery and said vehicle having interior surfaces defining a first portion of the periphery, said device comprising:

a) a roller mountable substantially transversely across the cargo area of the vehicle, said cargo area extending to a closure at an exterior opening of the vehicle;

b) a sheet of material connected to said roller and configured to be rolled and unrolled from said roller, said sheet of material having a size in an unrolled state sufficient to extend substantially transversely across the cargo area of the vehicle thereby forming a second portion of the periphery, said periphery being formed by the first and second portions of the periphery, said sheet permitting the maintenance of the temperature of the air in the region;

c) a rolling and unrolling device for rolling said sheet around said roller into a rolled state and unrolling said sheet from said roller into the unrolled state, said rolling and unrolling device having an electric motor which rotates said roller thereby rolling and unrolling said sheet;

d) a sensor device connected to the device for use in maintaining a temperature; and e) a remote transmitting device for transmitting a signal to said sensor device when said sensor is located at a distance away from said sensor device, said sensor device being capable of receiving a signal from said remote transmitting device when said remote transmitting device is located at a distance away from said sensor device and said sensor device being capable of activating the electric motor such that the electric motor rolls and unrolls said sheet into the desired rolled state or unrolled state.

2. The device for use in maintaining a temperature according to claim 1 further comprising:

a first connecting device for connecting said roller to the vehicle at one end of the roller and a second connecting device for connecting said roller to the vehicle at another end of the roller.

3. The device for use in maintaining a temperature according to claim 2 wherein each of said first and second connecting devices comprise a bracket which connects each of said ends of said roller to the vehicle.

4. The device for use in maintaining a temperature according to claim 1 wherein said rolling and unrolling device has a pull chain which is at least partially wrapped around said roller and which rotates said roller when said pull chain is pulled.

5. The device for use in maintaining a temperature according to claim 1 wherein said sheet is provided with a support strip extending transversely across an unrolled end of said sheet, said support strip allowing for all portions of the end of said sheet to be pulled uniformly in a single pulling direction when the end of the sheet is pulled by the support strip.

6. The device for use in maintaining a temperature according to claim 1 wherein at least a portion of said sheet is transparent.

7. The device for use in maintaining a temperature according to claim 1 wherein a portion of the sheet has releasable fabric loops which are engageable with hooks on a portion of the vehicle.

8. The device for use in maintaining a temperature according to claim 1 wherein said roller is connected to a wheel at both ends of said roller and each of said wheels rolls along one of two opposed track members, said track members being provided along the cargo area of the vehicle and extending toward the opening of the vehicle.

9. The device for use in maintaining a temperature according to claim 1 further comprising a biasing device connected to the roller which applies a tensioning force on the sheet on the roller when the sheet is in an unrolled position, said tensioning force being opposed to an unrolling force which permits unrolling of the sheet.

10. The device for use in maintaining a temperature according to claim 9 further comprising a ratcheting device which engages the roller in a nonrotating position when the unrolling force no longer unrolls the sheet, said ratcheting device permitting release of the roller from a nonrotating position and rolling of the sheet into a rolled state after application of a threshold force which unrolls the sheet at a predetermined velocity which allows the ratcheting device to disengage the roller, thus permitting the tensioning force applied by the biasing device to roll the sheet into the rolled state.

11. The device for use in maintaining a temperature in a vehicle of claim 1 in combination with a vehicle, said device being mounted in the cargo area of the vehicle in a position such that the roller extends substantially transversely across the cargo area of the vehicle.

12. A device for use in maintaining a temperature in a region in a cargo area of a shipping container, said region being defined by a periphery and said shipping container having interior surfaces defining a first portion of the periphery, said device comprising:
  a) a roller mountable substantially transversely across the cargo area of the shipping container, said cargo area extending to a closure at an exterior opening of the shipping containers;
  b) a sheet of material connected to said roller and configured to be rolled and unrolled from said roller, said sheet of material having a size in an unrolled state sufficient to extend substantially transversely across the cargo area of the shipping container thereby forming a second portion of the periphery, said periphery being formed by the first and second portions of the periphery, said sheet permitting the maintenance of the temperature of the air in the region;
  c) a rolling and unrolling device for rolling said sheet around said roller into a rolled state and unrolling said sheet from said roller into the unrolled state, said rolling and unrolling device having an electric motor which rotates said roller thereby rolling and unrolling said sheet;
  d) a sensor device connected to the device for use in maintaining a temperature; and
  e) a remote transmitting device for transmitting a signal to said sensor device when said sensor is located at a distance away from said sensor device, said sensor device being capable of receiving a signal from said remote transmitting device when said remote transmitting device is located at a distance away from said sensor device and said sensor device being capable of activating the electric motor such that the electric motor rolls and unrolls said sheet into the desired rolled state or unrolled state.

13. The device for use in maintaining a temperature according to claim 12 further comprising:
  a first connecting device for connecting said roller to the shipping container at one end of the roller and a second connecting device for connecting said roller to the shipping container at another end of the roller.

14. The device for use in maintaining a temperature according to claim 13 wherein each of said first and second connecting devices comprise a bracket which connects each of said ends of said roller to the shipping container.

15. The device for use in maintaining a temperature according to claim 12 wherein said rolling and unrolling device has a pull chain which is at least partially wrapped around said roller and which rotates said roller when said pull chain is pulled.

16. The device for use in maintaining a temperature according to claim 12 wherein said sheet is provided with a support strip extending transversely across an unrolled end of said sheet, said support strip allowing for all portions of the end of said sheet to be pulled uniformly in a single pulling direction when the end of the sheet is pulled by the support strip.

17. The device for use in maintaining a temperature according to claim 12 wherein at least a portion of said sheet is transparent.

18. The device for use in maintaining a temperature according to claim 12 wherein said roller is connected to a wheel at both ends of said roller and each of said wheels rolls along one of two opposed track members, said track members being provided along the cargo area of the shipping container and extending toward the opening of the shipping container.

19. The device for use in maintaining a temperature according to claim 12 further comprising a biasing device connected to the roller which applies a tensioning force on the sheet on the roller when the sheet is in an unrolled position, said tensioning force being opposed to an unrolling force which permits unrolling of the sheet.

20. The device for use in maintaining a temperature according to claim 19 further comprising a ratcheting device which engages the roller in a nonrotating position when the unrolling force no longer unrolls the sheet, said ratcheting device permitting release of the roller from a nonrotating position and rolling of the sheet into a rolled state after application of a threshold force which unrolls the sheet at a predetermined velocity which allows the ratcheting device to disengage the roller, thus permitting the tensioning force applied by the biasing device to roll the sheet into the rolled state.

21. The device for use in maintaining a temperature in a shipping container of claim 12 in combination with a shipping container, said device being mounted in the cargo area of the shipping container in a position such that the roller extends substantially transversely across the cargo area of the shipping container.

22. The device for use in maintaining a temperature according to claim 12 wherein a portion of the sheet has releasable fabric loops which are engageable with hooks on a portion of the shipping container.

\* \* \* \* \*